Jan. 5, 1937. T. J. MUENCH ET AL Des. Re. 20,230
CANDLE LAMP
Original Filed Jan. 24, 1936
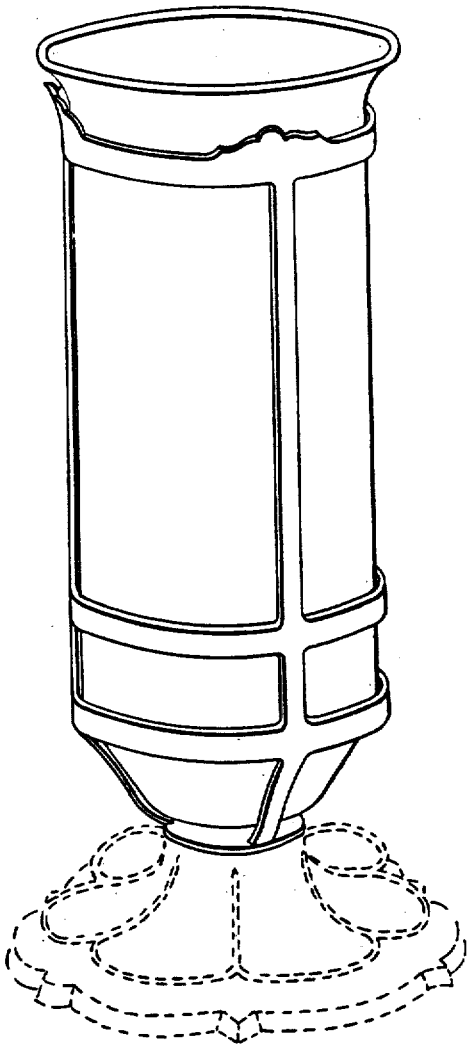
INVENTORS
Thomas J. Muench & Oscar D. Guilford
BY
Bodell & Thompson
ATTORNEYS.

Reissued Jan. 5, 1937

Des. Re. 20,230

UNITED STATES PATENT OFFICE 20,230

DESIGN FOR A CANDLE LAMP

Thomas J. Muench and Oscar D. Guilfoil, Syracuse, N. Y., assignors to Muench-Kreuzer Candle Company Inc., Syracuse, N. Y., a corporation of New York

Original No. 100,876, dated August 18, 1936, Serial No. 60,795, January 24, 1936, for 14 years. Application for reissue October 8, 1936, Serial No. 65,211

Term of patent 14 years

*To all whom it may concern:*

Be it known that we, Thomas J. Muench and Oscar D. Guilfoil, citizens of the United States, residing at Syracuse, in the county of Onondaga and State of New York, have invented a new, original, and ornamental Design for a Candle Lamp, of which the following is a specification, reference being had to the accompanying drawing forming part thereof.

The drawing is a perspective view of a candle lamp embodying our new design.

The essential features of the design reside in the parts shown in solid lines.

We claim:—

The ornamental design for a candle lamp substantially as shown and described.

THOMAS J. MUENCH.
OSCAR D. GUILFOIL.

CERTIFICATE OF CORRECTION.

)esign Reissue No. 20,230. January 5, 1937.

THOMAS J. MUENCH, ET AL.

It is hereby certified that error appears in the printed specification of the above numbered patent requiring correction as follows: Second column, line 4, after the word and period "lines." insert the following paragraph:

> The appearance of the opposite side of the lamp is substantially the same as the side shown.;

and that the said Letters Patent should be read with this correction therein that the same may conform to the record of the case in the Patent Office.

Signed and sealed this 2nd day of March, A. D. 1937.

Seal)

Henry Van Arsdale
Acting Commissioner of Patents..